United States Patent [19]

Harrison

[11] 4,256,479

[45] Mar. 17, 1981

[54] GRANULATION OF FERTILIZER BORATE

[75] Inventor: Cecil P. Harrison, Florence, Ala.

[73] Assignee: Tennessee Valley Authority, Muscle Shoals, Ala.

[21] Appl. No.: 17,522

[22] Filed: Mar. 5, 1979

Related U.S. Application Data

[63] Continuation of Ser. No. 939,541, Sep. 5, 1978, Pat. No. T986,002.

[51] Int. Cl.³ ................................................ C05D 9/00
[52] U.S. Cl. .................................... 71/61; 71/64 DA; 423/280; 423/288
[58] Field of Search ............ 71/64 D, 64 DA, 64 DB, 71/37, 64 DC, 41, 61, 31, 63; 423/280, 279, 288

[56] References Cited

U.S. PATENT DOCUMENTS

| | | | |
|---|---|---|---|
| 2,375,638 | 5/1945 | Englund | 423/279 X |
| 2,700,604 | 1/1955 | Knight | 71/64 D X |
| 2,885,279 | 5/1959 | Mortenson | 71/64 DA X |
| 2,998,310 | 8/1961 | O'Brien et al. | 423/280 X |
| 3,032,408 | 5/1962 | Baumann | 71/64 DA |
| 3,317,276 | 5/1967 | Lipscomb et al. | 71/64 D X |
| 3,860,409 | 1/1975 | Wilson | 71/64 D X |
| 3,888,653 | 6/1975 | Shirley | 71/64 DA X |

FOREIGN PATENT DOCUMENTS

| | | | |
|---|---|---|---|
| 641134 | 5/1962 | Canada | 423/280 |
| 868829 | 4/1971 | Canada | 423/280 |
| 49-14998 | 4/1974 | Japan | 423/279 |

OTHER PUBLICATIONS

Sauchelli, Manual on Fertilizer Manufacture, 1963, Industry Publications Inc., Caldwell, N.J., p. 312.

*Primary Examiner*—S. Leon Bashore
*Assistant Examiner*—Ferris H. Lander
*Attorney, Agent, or Firm*—Robert A. Petrusek

[57] ABSTRACT

A process for granulating crystalline fertilizer borate to produce a product with exceptionally satisfactory physical and chemical properties in regard to bulk blending with other fertilizer blend materials and also in regard to storage and handling properties. The process involves specialized procedures in processing the solid feedstock and granulating the solids with use of a small amount of acid solution. Product drying is not required.

7 Claims, No Drawings

GRANULATION OF FERTILIZER BORATE

The invention herein described may be manufactured and used by or for the Government for governmental purposes without the payment to me of any royalty therefor.

This application is a continuation of application Ser. No. 939,541, filed Sept. 5, 1978, for GRANULATION OF FERTILIZER BORATE now Defensive Publication No. T986,002, published Sept. 4, 1979.

My invention relates to a new process for granulating crystalline sodium tetraborate pentahydrate ($Na_2B_4O_7 \cdot 5H_2O$) and to the product resulting therefrom. More particularly, it relates to the production of granular fertilizer borate that has good handling properties and is very satisfactory for blending with other granular fertilizer materials. Still more particularly, my invention relates to a novel method for granulating $Na_2B_4O_7 \cdot 5H_2O$ with use of a liquid binder but without use of high-energy input.

As is well known, boron is among the numerous chemical elements that are essential to proper nutrition of living plants. Boron, being among the class of elements commonly known among agronomists as micronutrients, is required by plants in relatively small quantities in comparison with the required quantities of the so-called primary nutrients nitrogen, phosphorus, and potassium. However, the boron requirements of some important farm crops, for example cotton, sugar beets, and alfalfa, often exceed the amounts of the elements that are naturally available in farm soils. It is, therefore, a common practice to add small proportions of soluble boron compounds to some chemical fertilizers prior to their application on farm soils.

When boron compounds are so incorporated in chemical fertilizers, it is essential that the relatively small proportion of added boron compound be homogeneously distributed throughout the fertilizer mixture and that such homogeneity be maintained during all handling operations, including the operation of spreading the mixture on the soil. Failure to maintain homogeneity inevitably will result in a deficiency of boron supply to some plants and an oversupply, even to the extent of toxic overdosage, to other plants. It is essential, therefore, that methods of boron addition to fertilizers be employed that will ensure homogeneity.

Homogeneous incorporation of boron generally is not a problem in the manufacture of chemically granulated fertilizers, variously referred to as "compound" fertilizers, "complex" fertilizers, or "cogranulated" fertilizers. In the manufacture of this type fertilizer, all ingredients, including micronutrient compounds as well as primary nutrient compounds, normally are mixed homogeneously prior to formation of particulate granules, with the result that each granule of the resultant fertilizer mixture contains all ingredients in the predetermined proportion and in a mechanically and/or chemically bonded, nonsegregable union. It thus is assured that if the fertilizer is applied uniformly to the soil, all ingredients, including boron or other micronutrient compounds, likewise will be applied uniformly.

Homogeneous incorporation of boron and other micronutrient compounds is, however, a considerably greater problem in the manufacture of another important class of fertilizers, generally known as "bulk blends" or "dry-mixed" fertilizers. Fertilizers of this type consist of simple, dry, mechanical mixtures of discrete, nonbonded granules of two or more chemical compositions. The granules of different compositions are blended in proportions calculated to give a mixture of the desired fertilizer nutrient composition. This method of fertilizer preparation, being simple and adaptable to small production operations near the locations of fertilizer usage, is extremely popular; the estimated number of such plants in the United States presently is about 5200 with an annual production of about 10 million tons of mixtures. However, to ensure the homogeneity of such dry-blended fertilizers during mixing, handling, and field application, it has been found essential that all the various ingredients be of closely matched particle size distribution (1). Ignoring this requirement, and preparing blends from ingredients of unmatched particle size, inevitably results in segregation of the various components during mixing, handling, and spreading. Thus, homogeneity will be lost and the aforementioned undesirable agronomic effects of non-homogeneous field application will be encountered.

(1) Hoffmeister, George. "Quality Control in a Bulk Blending Plant." Proc. TVA Fertilizer Bulk Blending Conference, Louisville, Kentucky, Aug. 1-2, 1973.

In view of this important requirement that ingredients of bulk blends be matched in particle-size distribution, micronutrients, such as boron compounds, cannot properly be incorporated without due regard to particle size of the added micronutrient. Attempts to add micronutrients to granular bulk blends as nongranular salts have resulted in severe segregation problems. One reasonably satisfactory solution (2) has been to finely pulverize the micronutrient compound and add it to the blend with sufficient mixing action, and usually with the aid of a liquid binder, to cause the micronutrient compound to coat and adhere tightly to the granular fertilizer materials in the blend. The micronutrient thus, in effect, becomes an integral part of each fertilizer granule and its segregation from the fertilizer is prevented. Another, generally more appealing approach to preventing segregation of micronutrients in bulk blends involves preparation of the micronutrient compound or compound mixture in a granular form of particle-size distribution that matches that of the other granular ingredients of the bulk-blended fertilizer. Because of this matching of particle size, homogeneity of the final blend is ensured. This method generally is preferred by the manufacturers of bulk blend fertilizers because of its simplicity; the procedure employed, unlike the coating procedure described above, requires no special equipment and no handling or application of binders. Successful employment of the method does require, however, that suppliers of micronutrients, such as boron compounds, furnish the compounds in properly sized granular form.

(2) Silverberg, Julius; Young, R. D.; and Hoffmeister, George, Jr. "Preparation of Fertilizers Containing Micronutrients." TVA National Fertilizer Development Center, Muscle Shoals, Alabama. September 1977.

My present invention comprises an improved method for converting a relatively easily prepared, nongranular, fine-crystal boron compound, sodium tetraborate pentahydrate ($Na_2B_4O_7 \cdot 5H_2O$), to a granular form suitable in particle-size distribution, hardness, solubility, and other important characteristics for direct addition to bulk blend fertilizers to produce homogeneous, nonsegregating blends according to the method preferred by blend manufacturers and outlined above. In presently employed commercial practice, conversion of the sodium tetraborate pentahydrate to suitable granular form involves a high-energy melt-flaking process. Malting, which requires a temperature of 741° C. and the supplying of considerable latent heat of fusion plus heat to compensate for losses, results in dehydration of the sodium tetraborate pentahydrate to an essentially anhydrous melt of sodium tetraborate which contains the equivalent of about 68 percent $B_2O_3$. This melt then is cooled and solidified in thin sheets which in turn are crushed and screened to give chips of particle size approximating that of granular fertilizers. This crushing and screening operation naturally produces a significant amount of undersize material which can be converted to the desired granular particle size only by recycling to the melt operation and supplying additional amounts of energy for reprocessing. My invention, as will be apparent, completely eliminates the requirements for melting, dehydration, melt solidification, and sizing by crushing. Instead, the sodium tetraborate pentahydrate crystals are processed directly to the desired granular form by agglomeration with the aid of small amounts of a special, novel, yet inexpensive and readily available binding agent in standard granulation equipment such as a conventional pan-type granular. No heat input is required to the process either for granulation or drying, thus there is considerable energy saving in comparison with the fusion process. Also, in my process, the boron concentration in the product is not elevated, such as by dehydration in the melt process. Such elevation is a distinct disadvantage in production of granular micronutrients for fertilizer use since it naturally decreases the number of particles that will carry a given amount of boron to the field and thus results in a more diffuse scattering of particles and consequent reduction in average proximity of the nutrient to plant roots.

The sodium tetraborate pentahydrate utilized as feedstock to my process may be any suitable material, pure or impure, that contains chiefly that compound. One suitable material is a fine-crystal product marketed commercially under the name "Fertilizer Borate-48." The boron content of this product is equivalent to approximately 48 percent $B_2O_3$ or 14.9 percent B. The initial step of my process involves physical reduction of the sodium tetraborate pentahydrate material, at least in part, to a finely powdered form. It is preferable but not absolutely essential that at least 50 percent of the feed material be reduced to minus 35-mesh particle size. Such finely divided material may be obtained by milling crystalline sodium tetraborate pentahydrate either alone or in combination with undersize and oversize product recycled from a later screening operation in the process.

The preferred liquid binder used in my invention is a dilute solution of sulfuric acid. Industrial-grade acid is preferred because of the economics. Acids other than sulfuric likewise are satisfactory as binder for example, phosphoric acid and mixtures of sulfuric and phosphoric acid and are included in the invention. The preferred concentration of sulfuric acid binder used in my granulation process is 10 to 25 percent by weight. However, less concentrated or more concentrated acid should also be satisfactory. The proportion of diluted acid used is preferably 15 to 20 percent by weight of the dry borate feed.

Contacting of the acid solution binder with the properly sized borate feed material may be effected in any suitable manner to achieve granulation. For example, the pulverized borate material, together with recycle fines, can be fed to a conventional rotating pan granulator, a rotary drum granulator, a pug mill, a blunger, or any other suitable granulating device and the dilute acid can be sprayed simultaneously onto the feedstock soon after it enters the granulator. By proper adjustment of process variables, including feed rates of dry borate and liquid binder, granulator rotation speed, slope, and retention time, placement of liquid binder sprays, and other pertinent variables, a granular product containing a high proportion of granules of the desired particle size can be discharged from the granulating device. Granules thus discharged immediately exhibit moderate hardness and mechanical stability, due apparently to the chemical bonding action of the acid according to the following equation $$Na_2B_4O_7.5H_2O + H_2SO_4 \rightarrow Na_2SO_4 + 4H_3BO_3$$

and to a hydration reaction which removes liquid water according to the following equation $$Na_2B_4O_7.5H_2O + 5H_2O \rightarrow Na_2B_4O_7.10H_2O$$

Although not essential, it may be found advantageous to utilize a small, unheated rotary drum following the granulator to provide additional retention time for continuation of the reactions delineated above with resultant additional hardening of granules prior to screening. Screening may be done in any convenient manner, including the usual method employing stacked vibrating or shaking screens. A typical screen stack to be employed for production of granules that will match the size of most granular fertilizers consists of 6- and 14-mesh screens (Tyler screen series). Resultant granules diameters thus are in the desired range of 1.2 to 3.3 millimeters. Oversize material, meaning that not passing the 6-mesh screen, may be pulverized and recycled to the granulator along with the fresh borate feed. Undersize, meaning that passing the 14-mesh screen, may be recycled either with or without pulverization.

Product made by my process in the described manner consists of hard, desirably sized, free-flowing granules with good handling and storage properties. Granule hardness and stability increase even further during aging in storage. The material is eminently suitable for use as a non-segregating boron source in the formulating of bulk-blended fertilizers.

In order that those skilled in the art may better understand how the present invention can be practiced, the following examples are given by way of illustration and not necessarily by way of limitation.

EXAMPLE I

Commercial fine-crystal sodium tetraborate pentahydrate (Fertilizer Borate-48) was first pulverized to minus 35-mesh particle size in a micropulverizer and then was pan granulated in continuous operation with use of laboratory bench-scale equipment. The pan granulator was 18 inches in diameter by 4 inches deep, and in operation it was inclined about 50 degrees and rotated at about 50 rpm. The direction of rotation of the pan was counterclockwise when viewing the pan from above. The pulverized borate was fed continuously to the pan at a rate of about 300 grams per minute. Point of feed was at the upper active area (about 11:00 o'clock) in the pan. The binder, a 10 percent by weight solution of industrial-grade sulfuric acid, was sprayed continuously with use of atomizing air onto the active area just below and toward the pan perimeter from the point of addition of the solid feed. Solution spray was at the rate of about 40 milliliters per minute, thus the weight proportion of acid solution sprayed onto the borate was about 14 percent. During the granulation run (2½ hr.), there were no significant operating problems and the operation was not dusty. Product discharging continuously from the pan contained an estimated 80 percent of onsize material (−6 +14 mesh, Tyler). Drying was not required; passing the granulated material through an unheated rotary drum with about 3 minutes retention time was sufficient for the granules to become nontacky and noncaking. At this point, the crushing strength of the granules (measured on −7 +8 mesh granules) was 3 pounds. After aging for 2 days, crushing strength of the granules was 10 to 15 pounds. Boron content of the product (determined by chemical analysis) was equivalent to 44 percent $B_2O_3$. The product exhibited good physical properties and was completely soluble in water.

EXAMPLE II

Granular borate product was made from solid feedstock that consisted of a mixture of 75 percent by weight of sodium tetraborate pentahydrate pulverized as in Example I and 25 percent by weight of the crystalline borate of "as received" size, which was 75 percent in the minus 10− +35 mesh range. This example describes the procedure which would normally be used in a commercial granulation plant which has 75 percent of the throughput as fine size recycle. Recycle are fines from the screens and pulverized oversize. The granulation procedure, feed rates, acid binder, and equipment were the same as described in Example I. During the granulation test (1½ hr), there were no significant operating problems and the operation was clean (no dust). The proportion of onsize product (−6 +14 mesh, Tyler) produced was about 84 percent. Drying was not required and crushing strength of the granules discharging directly from the pan was about 9 pounds (measured on −7 +8 mesh granules); crushing strength after aging for about 1 day was 15 to 16 pounds. The product exhibited all favorable characteristics of that made in Example I.

EXAMPLE III

Granular borate product was made from solid feedstock that was a mixture of about 33⅓ percent by weight of product recycle consisting of fines and crushed oversize material, about 33⅓ percent by weight of crystalline borate "as received," and 33⅓ percent pulverized fresh borate. The granulation procedure, feed rates, acid binder, and equipment were the same as described in Example I. During the granulation test (2½ hr), there were no significant operating problems and the operation was not dusty. The proportion of onsize product (−6 +14 mesh, Tyler) produced was 66 percent. Drying was not required and crushing strength of the granules discharging from the pan was about 4 pounds (measured on −7 +8 mesh granules); crushing strength of the granules after aging for 1 day was 9 to 13 pounds.

EXAMPLE IV

Commercial fine-crystal sodium tetraborate (Fertilizer Borate-48) was first pulverized in a micropulverizer and then granulated batchwise in the laboratory pan granulator described in Example I. The pulverized borate, in the amount of 1000 grams, was charged to the pan, and after rotation was started 166 grams of a 10 percent by weight solution of industrial-grade sulfuric acid was sprayed, with use of atomizing air, onto the active area in the pan to cause granulation. The granular product was then removed from the pan and a portion was dried 72 hours at about 75° F. and another portion was dried for the same time at 150° F. before sizing by screening. Crushing strength of the granules dried at both test conditions was about 5 pounds (measured on −7 +8 mesh granules). Screening indicated that approximately 33 percent of the product was in the desired particle size range of 6 to 14 mesh (Tyler). The product exhibited all the favorable characteristics of that made in Example I.

EXAMPLE V

Increasing the concentration of the acid solution, described in Example IV, to 50 and 91 percent concentration resulted in weak granules; crushing strength of the minus 7- plus 8-mesh size was less than 1 pound.

EXAMPLE VI

Commercial fine crystal sodium tetraborate pentahydrate was pulverized to minus 35-mesh particle size in a micropulverizer and then was pan granulated in continuous operation with use of equipment and according to the procedure described in Example I. The acid binder was a 2.18 normal wet-process phosphoric acid solution (6.9 percent $H_3O_4$) used in the proportion of 18 percent by weight of acid solution to pulverized sodium tetraborate pentahydrate. During the granulation run (2½ hr), there were no significant operating problems and the operation was not dusty. Product discharging continuously from the pan contained about 80 percent of onsize material (−6 +14 mesh, Tyler), and at this point, crushing strength of the granules (measured on −7 +8 mesh granules) was about 4 pounds. After aging for 1 day, crushing strength of the granules was 8 to 9 pounds. Boron content of the product (determined by chemical analysis) was equivalent to 48.7 percent $B_2O_3$. Drying was not required and the product exhibited good physical properties.

After sifting and winnowing through the data herein presented as well as other results and operations of my new, novel, and improved process for producing granular crystalline fertilizer borate eminently suitable for subsequent fertilizer bulk-blending operations, the operating variables and preferred conditions for carrying out my process are summarized below:

| Variables | Limits | Preferred |
|---|---|---|
| Borate feedstock[a] | | |
| Particle size (Tyler), wt. % of solid feed[b] | | |
| As received | Minus 10 mesh | Minus 35 mesh |
| Temperature, °F. | 0° F.-120° F. | Ambient |
| Liquid feedstock | | |
| Sulfuric acid[c] | | |
| Concentration, wt. % $H_2SO_4$ | 5-91 | 10-25 |
| Temperature, °F. | 32-220 | Ambient |
| Phosphoric acid[d] | | |
| Concentration, wt. % $P_2O_5$ | 1-54 | 4-6 |
| Temperature, °F. | 32-220 | Ambient |

| | % passing indicated screen | | |
|---|---|---|---|
| Tyler screen size | Borate-48 "as required" | Pulverized borate | Recycle fines |
| 10 | 100 | — | — |
| 16 | 98 | — | — |
| 20 | 95 | 100 | — |
| 35 | 24 | 99 | — |
| 65 | 5 | 89 | 100 |
| 100 | 4 | 72 | |
| 150 | — | 51 | |

| | | |
|---|---|---|
| 200 | 2 | 25 |
| 325 | — | 9 |

[a] Fertilizer Borate-48, United States Borax and Chemical Corporation, Los Angeles, California.
[b] Typical particle size.
[c] Industrial grade sulfuric acid, 91% $H_2SO_4$.
[d] Wet-process phosphoric acid, 54% $P_2O_5$ before dilution.

While we have shown and described particular embodiments of our invention, modifications and variations thereof will occur to those skilled in the art. We wish it to be understood therefore that the appended claims are intended to cover such modifications and variations which are within the true scope and spirit of our invention.

What I claim as new and desire to secure by Letters Patent of the United States is:

1. A process for the production of high-purity granular crystalline borate of a predetermined closely controlled particle size range suitable for subsequent fertilizer bulk-blending operations which comprises the steps of:

(1) maintaining in a horizontally inclined rotary pan a bed of fines recycled from a later-mentioned sizing step in continuous and alternating rising and cascading motion;

(2) introducing a stream of an inorganic acid selected from the group comprising sulfuric, phosphoric, and mixtures thereof, onto the upper active area of the cascading portion of said bed of fines;

(3) introducing a stream of particulate sodium tetraborate pentahydrate onto the upper active area of the cascading portion of said bed of fines juxtaposed said stream of said inorganic acid in step 2, the proportion of said stream of inorganic acid from step 2 to the proportion of said stream of particulate sodium tetraborate pentahydrate ranging from about 15 to about 20 percent by weight of the dry borate feed;

(4) maintaining the temperature of said bed of fines in said horizontally inclined rotary pan at about ambient temperature;

(5) maintaining the material introduced into said horizontally inclined rotary pan for a time sufficient to effect therein granules of crystalline borate ranging from about 66 percent to about 84 percent $-6 +14$ mesh Tyler;

(6) discharging continuously over the lower rim of said horizontally inclined rotary pan a granular, dry solid sodium tetraborate pentahydrate material; and (7) sizing by screening said withdrawn material, returning the undersize or crushed oversize to the upper rim of said horizontally inclined rotary pan and withdrawing the onsize material as product.

2. The process of claim 1 wherein the inorganic acid utilized is sulfuric acid having a concentration in the range from about 5 to about 91 percent by weight $H_2SO_4$, and wherein said sulfuric acid is utilized in proportions such that it is in a ratio ranging from about 3 to about 30 percent by weight of the particulate sodium tetraborate pentahydrate introduced into said inclined rotary pan.

3. The process of claim 1 wherein the inorganic acid utilized is sulfuric acid having a concentration in the range from about 10 to about 25 percent by weight $H_2SO_4$, and wherein said sulfuric acid is utilized in proportions such that it is in a ratio ranging from about 15 to about 20 percent by weight of the particulate sodium tetraborate pentahydrate introduced into said inclined rotary pan.

4. The processes of claims 2 or 3 wherein said sodium tetraborate pentahydrate is of a size such that approximately 100 percent passes a 10-mesh Tyler screen size.

5. The process of claim 1 wherein the inorganic acid is phosphoric and has a concentration as weight percent $P_2O_5$ ranging upwards to about 54 percent, and wherein said phosphoric acid is utilized in proportions such that it is in a ratio ranging from about 3 to about 20 percent by weight of the particulate sodium tetraborate pentahydrate introduced into said inclined rotary pan.

6. The process of claim 5 wherein the inorganic acid is phosphoric and has a concentration in the range of about 4 to about 6 weight percent $P_2O_5$, and wherein said phosphoric acid is utilized in proportions such that it is in a ratio ranging from about 15 to about 20 percent by weight of the particulate sodium tetraborate pentahydrate introduced into said inclined rotary pan.

7. The processes of claims 5 or 6 wherein said sodium tetraborate pentahydrate is of a size such that approximately 100 percent passes a 10-mesh Tyler screen size.

* * * * *